(12) United States Patent
Voss et al.

(10) Patent No.: US 9,163,746 B2
(45) Date of Patent: Oct. 20, 2015

(54) ELECTROMAGNETIC VALVE, IN PARTICULAR FOR SLIP-CONTROLLED MOTOR VEHICLE BRAKE SYSTEMS

(71) Applicant: Continental Teves AG & Co. oHG, Frankfurt (DE)

(72) Inventors: Christoph Voss, Frankfurt (DE); Christian Courth, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/388,011

(22) PCT Filed: Mar. 22, 2013

(86) PCT No.: PCT/EP2013/056020
§ 371 (c)(1),
(2) Date: Sep. 25, 2014

(87) PCT Pub. No.: WO2013/149851
PCT Pub. Date: Oct. 10, 2013

(65) Prior Publication Data
US 2015/0048268 A1    Feb. 19, 2015

(30) Foreign Application Priority Data
Apr. 4, 2012 (DE) .......................... 10 2012 205 503

(51) Int. Cl.
*F16K 31/06* (2006.01)
*B60T 8/36* (2006.01)
*B60T 8/00* (2006.01)

(52) U.S. Cl.
CPC .............. *F16K 31/0655* (2013.01); *B60T 8/00* (2013.01); *B60T 8/363* (2013.01); *F16K 31/0658* (2013.01); *F16K 31/0686* (2013.01)

(58) Field of Classification Search
CPC ................................................... F16K 31/0655
USPC .............. 251/129.07, 129.15–129.17, 129.19
See application file for complete search history.

(56) References Cited

U.S. PATENT DOCUMENTS 4,597,558 A * 7/1986 Hafner et al. ............... 239/585.1
4,783,049 A * 11/1988 Northman et al. ....... 251/129.14
(Continued)

FOREIGN PATENT DOCUMENTS

DE       19716856      10/1998
DE     102006019464     9/2007
(Continued)

OTHER PUBLICATIONS

International Search Report for PCT/EP2013/056020 mailed Jun. 18, 2013.
(Continued)

*Primary Examiner* — Craig Schneider
*Assistant Examiner* — Daniel P Donegan
(74) *Attorney, Agent, or Firm* — RatnerPrestia

(57) ABSTRACT

The invention relates to an electromagnetic valve, comprising a valve tappet, which is arranged in a valve housing and which can open or close a valve passage in the valve housing, a magnet armature, which is provided in order to actuate the valve tappet and through which a hole passes for accommodating the valve tappet, and a restoring spring, which acts on the valve tappet and the spring end of which facing away from the magnet armature is supported on a magnet core in the valve housing. For precise valve adjustment, an adjustment sleeve is fixed in the hole of the magnet armature, in which adjustment sleeve the valve tappet is fastened in some sections at the same time.

10 Claims, 4 Drawing Sheets

(56) References Cited

U.S. PATENT DOCUMENTS

| | | | |
|---|---|---|---|
| 4,984,549 A * | 1/1991 | Mesenich | 123/472 |
| 5,476,313 A | 12/1995 | Lauer | |
| 5,605,178 A * | 2/1997 | Jennins | 137/625.65 |
| 6,056,264 A * | 5/2000 | Benson et al. | 251/129.19 |
| 6,113,066 A * | 9/2000 | Hohl et al. | 251/129.02 |
| 6,315,268 B1 * | 11/2001 | Cornea et al. | 251/129.15 |
| 6,644,623 B1 * | 11/2003 | Voss et al. | 251/129.15 |
| 7,150,196 B2 * | 12/2006 | Segawa et al. | 73/722 |
| 7,195,027 B2 | 3/2007 | Goossens | |
| 7,513,445 B2 * | 4/2009 | Ricco et al. | 239/585.3 |
| 7,552,909 B2 * | 6/2009 | Ricco et al. | 251/129.18 |
| 8,231,104 B2 * | 7/2012 | Voss | 251/129.15 |
| 2005/0173979 A1 * | 8/2005 | Voss | 303/119.2 |
| 2006/0202144 A1 * | 9/2006 | Ricco et al. | 251/129.16 |
| 2008/0067461 A1 * | 3/2008 | Petersen | 251/129.15 |
| 2008/0203343 A1 * | 8/2008 | Kratzer | 251/129.15 |
| 2011/0186760 A1 * | 8/2011 | Michl | 251/129.15 |
| 2013/0181149 A1 * | 7/2013 | Mitsumata et al. | 251/129.01 |

FOREIGN PATENT DOCUMENTS

| | | |
|---|---|---|
| DE | 102008013271 | 9/2009 |
| WO | 9315941 | 8/1993 |
| WO | 03093083 | 11/2003 |

OTHER PUBLICATIONS

German Search Report mailed Oct. 29, 2012 in counterpart German Application No. 10 2012 205 503.7, including partial translation.
Written Opinion of the International Searching Authority for International Application No. PCT/EP2013/056020.

* cited by examiner

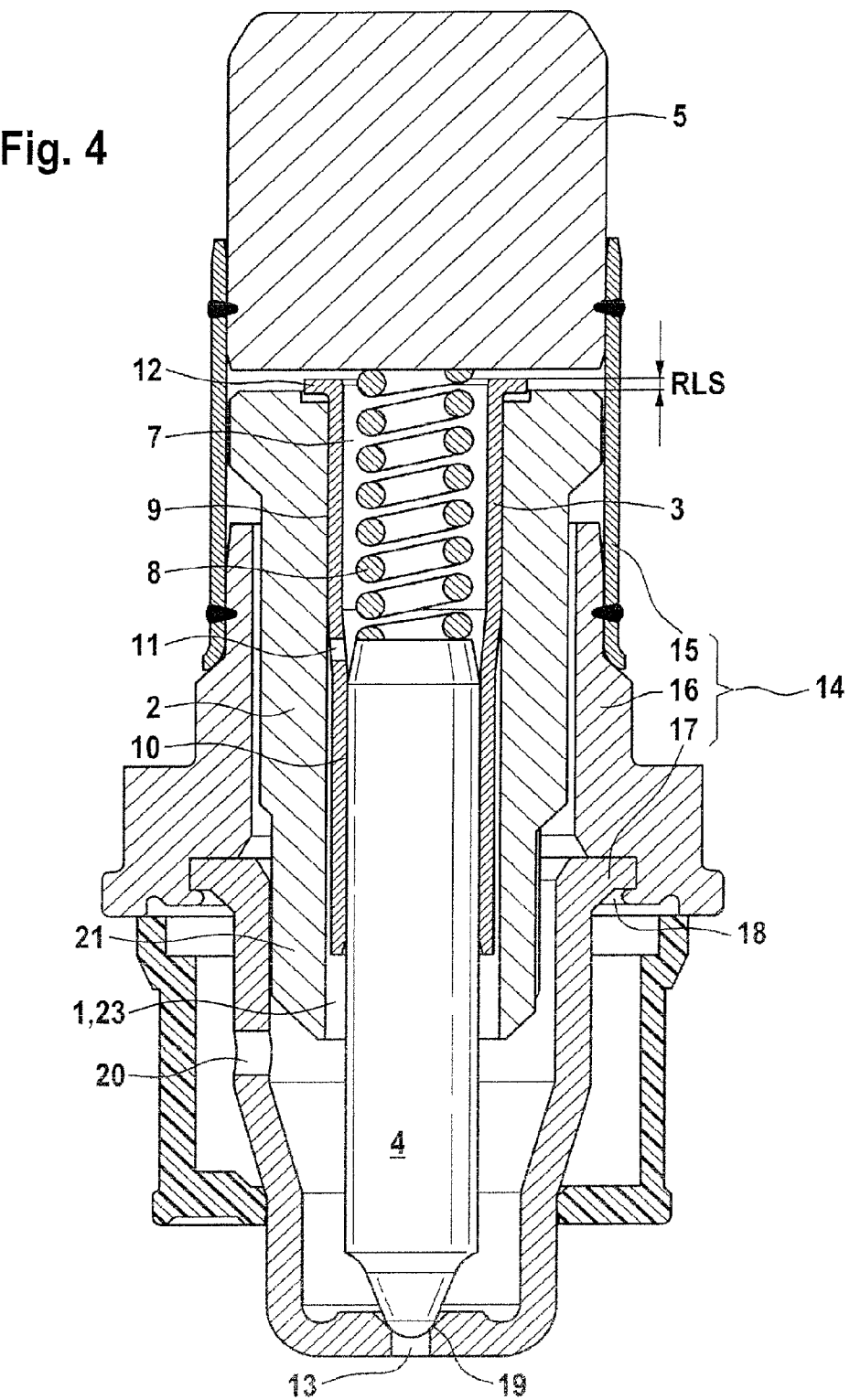

ELECTROMAGNETIC VALVE, IN PARTICULAR FOR SLIP-CONTROLLED MOTOR VEHICLE BRAKE SYSTEMS

CROSS REFERENCE TO RELATED APPLICATIONS

This application is the U.S. National Phase Application of PCT International Application No. PCT/EP2013/056020, filed Mar. 22, 2013, which claims priority to German Patent Application No. 10 2012 205 503.7, filed Apr. 4, 2012, the contents of such applications being incorporated by reference herein.

FIELD OF THE INVENTION

The invention relates to an electromagnetic valve, in particular for slip-controlled motor vehicle brake systems

BACKGROUND OF THE INVENTION

WO 03/093083 A1, which is incorporated by reference, has already disclosed an electromagnetic valve of the type stated, the magnet armature of which is penetrated by a hole in order to accommodate a valve tappet. A return spring is supported on the valve tappet, and the valve tappet is moved in the magnet armature in order to set the spring preloading force.

SUMMARY OF THE INVENTION

An aspect of the present invention comprises an electromagnetic valve of the type stated in a low-cost way using means that are as simple as possible and functionally appropriate and to improve it in such a way that simple, precise setting of the residual air gap provided between the magnet armature and the magnet core is possible.

BRIEF DESCRIPTION OF THE DRAWINGS

Further features and advantages of the invention will emerge from the following description of a number of illustrative embodiments with reference to FIGS. 1 to 4, or of which:

FIG. 4 shows a fourth illustrative embodiment of the invention by means of a longitudinal section through an electromagnetic valve, the magnet armature of which has an extended guide section which extends into a valve housing bottom part closed in the shape of a pot.

DETAILED DESCRIPTION OF THE PREFERRED EMBODIMENTS

Figure 1:
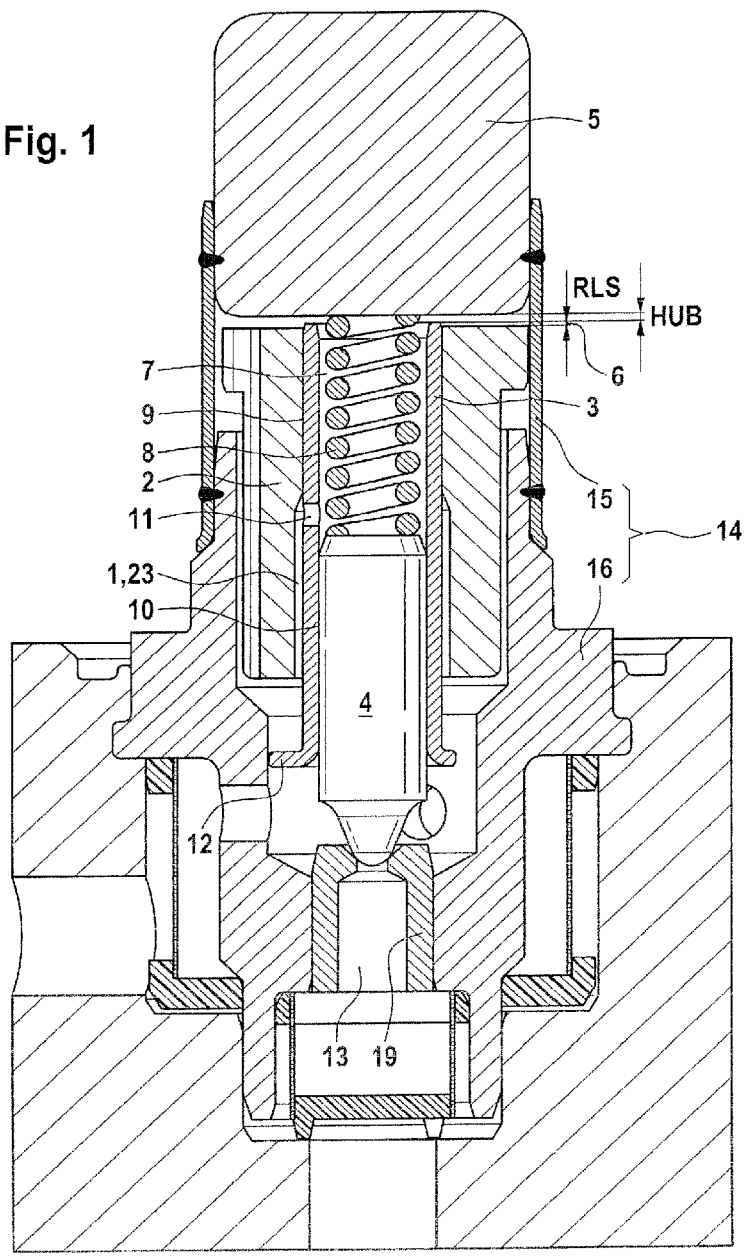
FIG. 1 shows a first illustrative embodiment of the invention by means of a longitudinal section through an electromagnetic valve, the adjustment sleeve of which has a collar for improved centering of the magnet armature subassembly within the valve housing.

The common features of all the electromagnetic valves depicted in FIGS. 1 to 4 will be explained first of all below, said electromagnetic valves preferably being used for slip-controlled motor vehicle brake systems. The electromagnetic valves shown consist of functional elements that are known per se. These include in each case a valve passage 13, which is arranged in a valve housing 14 and can be closed under the action of a return spring 8 by means of a valve tappet 4 arranged on a magnet armature 2 or can be opened by means of a magnet coil (not depicted). For this purpose, the magnet armature 2 is guided over some sections of the circumferential surface thereof in the valve housing 14 in such a way as to be axially movable over a defined working stroke, wherein the return spring 8 is supported by means of its spring end facing away from the magnet armature 2 on a magnet core 5 which closes the valve housing 14. In the four illustrative embodiments under consideration, the magnet core 5 is in each case pressed in as a closure plug into an austenitic housing sleeve 15, which, as part of the valve housing 14, is welded to a thick-walled rigid tubular body 16 that ensures secure fastening in a valve location hole in a valve locating body.

All the electromagnetic valves depicted are closed in the electromagnetically unexcited position, for which purpose the return spring 8 arranged above the magnet armature 2 is in each case supported directly on the valve tappet 4, a section of which is accommodated within a coaxial hole 1 in the magnet armature 2. By means of suitable electronic analog control, the valve coil to be mounted on the valve housing 14 can in each case be activated in proportion to a current, providing the prerequisite for continuously variable control of the valve flow rate.

In order to ensure precise setting of the electromagnetic valves depicted in FIGS. 1 to 4, an adjustment sleeve 3, in which a section of the valve tappet 4 is secured, is in each case fixed in the hole 1 in the magnet armature 2. By means of the adjustment sleeve 3, particularly simple, infinitely variable setting of the residual air gap RLS is ensured.

In order to prevent unwanted magnetic flux leakages and also "magnetic adhesion" of the magnet armature 2 to the magnet core 5, the adjustment sleeve 3 is produced from a material which does not conduct the magnetic flux, in particular an austenitic steel.

As is clear from all the figures, the adjustment sleeve 3 has an overhang 6 at the end face of the magnet armature 2 facing the magnet core 5, the axial extent of said overhang corresponding to the residual air gap RLS between the magnet armature 2 and the magnet core 5, which is to be precisely maintained during electromagnetic excitation. For this purpose, a section of the adjustment sleeve 3 is adjustable to any desired extent in the hole 1 in the magnet armature 2 by means of a sliding interference fit.

The valve tappet 4 is fixed in the adjustment sleeve 3 by the same securing method, wherein the depth to which the valve tappet 4 is pressed into the adjustment sleeve 3 is defined by an installation space 7 required for the return spring 8 in the adjustment sleeve 3.

Both the frictional force acting in the sliding interference fit between the adjustment sleeve 3 and the magnet armature 2 and that acting in the sliding interference fit between the adjustment sleeve 3 and the valve tappet 4 are at least equal in magnitude to the mechanical and hydraulic forces acting on the adjustment sleeve 3 and the valve tappet 4 during valve switching. In this context, the adjustment sleeve 3 has two holding sections 9, 10, of which the first holding section 9 includes the interference joint between the outer circumference of the adjustment sleeve 3 and the hole 1, while the second holding section 10 is defined by the interference joint between the inner circumference of the adjustment sleeve 3 and the valve tappet 4.

It can furthermore be seen from all the figures that, adjoining the first holding section 9, in the region of the second holding section 10, an annular space 23 is provided between the adjustment sleeve 3 and the hole 1 in the magnet armature 2, with the result that a pressure equalizing hole 11 arranged in the adjustment sleeve 3 in the region of transition between the first and second holding sections 10 is in hydraulically pressure equalizing connection via the annular space 23 with an installation space 7 accommodating the return spring 8 in the adjustment sleeve 3. The annular space 23 furthermore allows a tolerance-compensating radial expansion of the second holding section 10, thereby favoring the pressing of the valve tappet 4 into the adjustment sleeve 3.

It is furthermore clear from FIGS. 1 to 4 that the adjustment sleeve 3 is provided at least at one sleeve end with a collar 12 which, according to FIGS. 2 to 4, rests locally either as an axial stop on the magnet core 5 or, according to FIG. 1, as an armature- and tappet-centering aid on the inner wall of the valve housing 14, for which purpose the collar 12 of the adjustment sleeve 3 projects below the magnet armature 2. The collar 12 has a plurality of circumferentially distributed recesses, which allow unhindered compensation of the liquid volume situated above and below the collar 12 in the valve housing 14.

According to FIG. 1, the nonmagnetic properties of the adjustment sleeve 3 and of the collar 12 attached thereto advantageously result in nonmagnetic and therefore friction-minimized guidance for the valve tappet 4 and the magnet armature 2 in the valve housing 14. Since the valve tappet 4 is pressed directly into the nonmagnetic adjustment sleeve 3, there is therefore no contact with the magnetic material of the magnet armature 2, with the result that, irrespective of the material chosen, the valve tappet 4 is not subject to any unwanted magnetization, which could have a disadvantageous effect on valve control, the effect being magnetic decoupling.

Individual differences between the illustrative embodiments shown in FIGS. 1 to 4 will be explained below.

As already mentioned briefly at the outset, FIG. 1 shows an extension of the adjustment sleeve 3 below the magnet armature 2 in order to ensure precise guidance of the magnet armature 2 with the valve tappet 4 in the direction of the valve seat 19 in the valve housing 14 by means of the collar 12 formed at the end of the extension.

Figure 2:
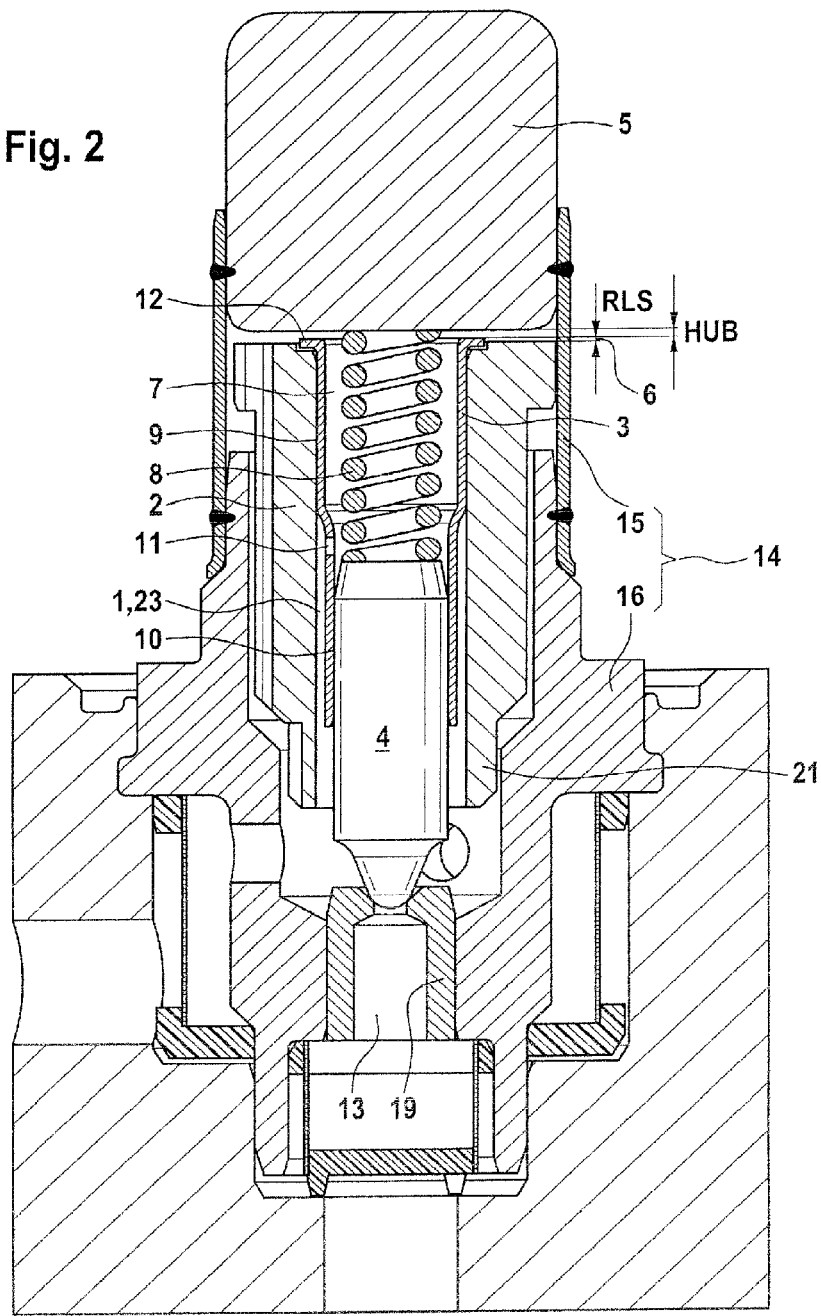
FIG. 2 shows a second illustrative embodiment of the invention by means of a longitudinal section through an electromagnetic valve, the adjustment sleeve of which has a collar which rests in full surface contact and therefore without wear against the magnet core during electromagnetic excitation in the magnet armature.

As a departure from FIG. 1, FIGS. 2 and 4 show an extension of the magnet armature 2 having a plurality of guide ribs 21, which are supported on the inner wall of the valve housing 14, to provide precise guidance of the magnet armature 2 and of the valve tappet 4 in the direction of the valve seat 19.

Figure 3:
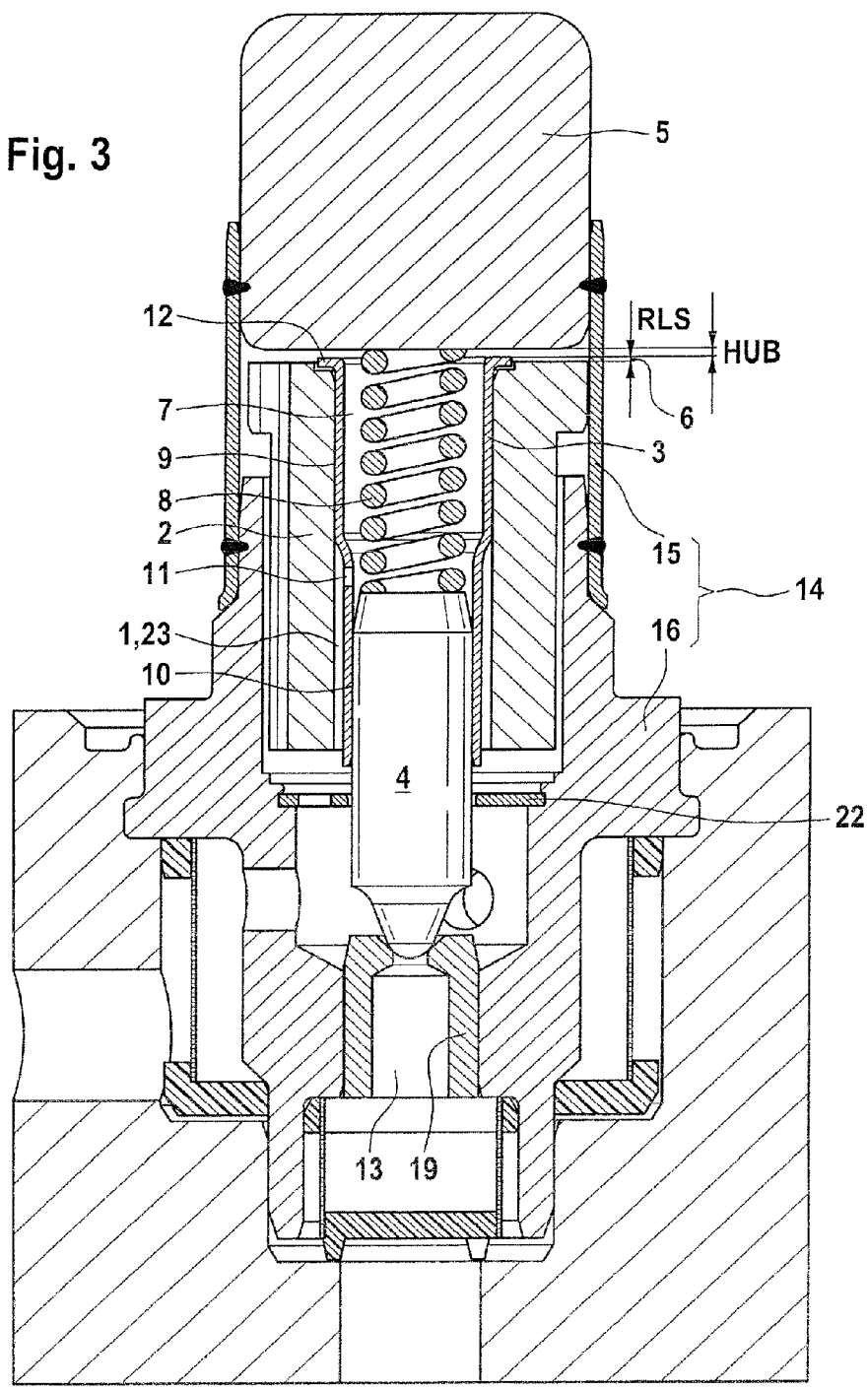
FIG. 3 shows a third illustrative embodiment of the invention by means of a longitudinal section through an electromagnetic valve, the valve tappet of which is guided in the direction of the valve seat by means of a centering washer.

Another modification for precise guidance of the magnet armature 2 with the valve tappet 4 in the direction of the valve seat 19 is shown in FIG. 3, according to which a nonmagnetic centering washer 22, which is provided with pressure equalizing openings and through which the valve tappet 4 extends with a small running clearance, is fixed below the magnet armature 2 in the valve housing 14.

In respect of the construction of the valve housings 14, it may be mentioned that the electromagnetic valves depicted in FIGS. 1 to 3 have a solid tubular body 16, in which the valve seat 19 is press fitted as a separate component. In FIGS. 1 to 3, the valve housing 14 is in each case composed of the tubular body 16 and the housing sleeve 15, which is welded to the tubular body 16. As a departure from this, the tubular body 16 in FIG. 4 is connected at the opposite end from the housing sleeve 15 to a further, thin-walled, pot-shaped housing sleeve 17, with the special feature that the further housing sleeve 17 has a radially encircling collar which is fixed in a recess 18 on the tubular body 6 by plastic deformation by means of a suitable tool. The further housing sleeve 17 is composed of a hardened ferritic material in order to enable the valve seat 19 to be embodied in as wear-free a manner as possible by deep drawing directly on the bottom of the pot-shaped housing sleeve 1 if desired or required, as an alternative to the illustration in FIGS. 1 to 3. The valve passage 13 arranged in the valve seat 19 and the passage 20 arranged in the wall of the further housing sleeve 17 can then be produced jointly in a particularly low-cost manner by punching or stamping.

The design features presented thus result in an electromagnetic valve, the residual air gap RLS of which can be set in a simple and precise manner by means of the adjustment sleeve 3 press fitted in the hole 1 in the magnet armature 2 since the adjustment sleeve 3 is simply moved until the desired overhang 6 on the upper side of the magnet armature 2 is achieved, the overhang 6 corresponding to the dimension of the residual air gap RLS.

In order to be able to compensate for the tolerances which occur in the manufacture of the return spring 8, setting of the installation space 7 required for the return spring 8 is accomplished in an equally simple and precise manner since the return spring 4 is supported on the end of the valve tappet 4 while the valve tappet 4 is moved continuously in the second holding section 10 of the adjustment sleeve 3 until a defined spring length is achieved.

LIST OF REFERENCE SIGNS 1 hole
2 magnet armature
3 adjustment sleeve
4 valve tappet
5 magnet core
6 overhang
7 installation space
8 return spring
9 holding section
10 holding section
11 pressure equalizing hole
12 collar
13 valve passage
14 valve housing
15 housing sleeve
16 tubular body
17 housing sleeve
18 recess
19 valve seat
20 passage
21 guide rib
22 centering washer
23 annular space

The invention claimed is:

1. An electromagnetic valve, for slip-controlled motor vehicle brake systems, comprising:
   a valve tappet, which is arranged in a valve housing and which can open or close a valve passage in the valve housing,
   a magnet armature, which is provided in order to actuate the valve tappet and is penetrated by a hole in order to accommodate the valve tappet,
   a return spring, which acts on the valve tappet and the spring end of which facing away from the magnet armature is supported on a magnet core in the valve housing, and
   wherein an adjustment sleeve is fixed in the hole in the magnet armature, and the valve tappet is fixed in the adjustment sleeve by a sliding interference fit, wherein a depth to which the valve tappet is pressed into the adjustment sleeve is defined by a respective installation space required for the return spring in the adjustment sleeve.

2. The electromagnetic valve as claimed in claim 1, wherein at an end face of the magnet armature facing the magnet core, the adjustment sleeve has an overhang, the axial extent of which corresponds to a dimension of a residual air gap (RLS) between the magnet armature and the magnet core, said gap being required to limit the magnet armature stroke (HUB).

3. The electromagnetic valve as claimed in claim 1, wherein the adjustment sleeve is fixed in the hole in the magnet armature by a sliding interference fit.

4. The electromagnetic valve as claimed in claim 1, wherein the adjustment sleeve is provided at least at one sleeve end with a collar which is guided either as an axial stop on the magnet core or as an armature-centering aid on the inner wall of the valve housing in the region between the magnet armature and the valve passage.

5. The electromagnetic valve as claimed in claim 1, wherein the adjustment sleeve is produced from a material which does not conduct the magnetic flux.

6. The electromagnetic valve as claimed in claim 1, wherein the adjustment sleeve is produced from an austenitic steel.

7. An electromagnetic valve, for slip-controlled motor vehicle brake systems, comprising:
a valve tappet, which is arranged in a valve housing and which can open or close a valve passage in the valve housing,
a magnet armature, which is provided in order to actuate the valve tappet and is penetrated by a hole in order to accommodate the valve tappet, and
a return spring, which acts on the valve tappet and the spring end of which facing away from the magnet armature is supported on a magnet core in the valve housing,
wherein an adjustment sleeve is fixed in the hole in the magnet armature by a sliding interference fit, and the valve tappet is fixed in the adjustment sleeve by a sliding interference fit, and
wherein both the frictional force acting in the sliding interference fit between the adjustment sleeve and the magnet armature and that acting in the sliding interference fit between the adjustment sleeve and the valve tappet are at least equal in magnitude to the mechanical and hydraulic forces acting on the adjustment sleeve and the valve tappet during valve switching.

8. An electromagnetic valve, for slip-controlled motor vehicle brake systems, comprising:
a valve tappet, which is arranged in a valve housing and which can open or close a valve passage in the valve housing,
a magnet armature, which is provided in order to actuate the valve tappet and is penetrated by a hole in order to accommodate the valve tappet,
a return spring, which acts on the valve tappet and the spring end of which facing away from the magnet armature is supported on a magnet core in the valve housing, and
wherein an adjustment sleeve is fixed in the hole in the magnet armature, and
wherein the adjustment sleeve has two holding sections, of which the first holding section includes an interference joint between the outer circumference of the adjustment sleeve and the hole, and the second holding section includes an interference joint between the inner circumference of the adjustment sleeve and the valve tappet.

9. The electromagnetic valve as claimed in claim 8, wherein an annular space is provided between the adjustment sleeve and the magnet armature, adjoining the first holding section, in the region of the second holding section.

10. The electromagnetic valve as claimed in claim 9, wherein the adjustment sleeve is penetrated in the region of transition from the second holding section to the first holding section by a pressure-equalizing hole, which connects the annular space hydraulically to an installation space accommodating the return spring in the adjustment sleeve.

\* \* \* \* \*